United States Patent
Heinze

[15] 3,659,671
[45] May 2, 1972

[54] TAG WHEEL LIFT

[72] Inventor: Alvin L. Heinze, Weld County, Colo.

[73] Assignee: H & L Tag Lift Corporation, Denver, Colo.

[22] Filed: Jan. 23, 1970

[21] Appl. No.: 5,263

[52] U.S. Cl. .................................180/24.02, 280/104.5 B
[51] Int. Cl. ...................................B62d 61/12, B60g 5/00
[58] Field of Search ...........180/24.02; 280/104.5, 104.5 A, 280/104.5 B

[56] References Cited

UNITED STATES PATENTS

| 2,659,446 | 11/1953 | Willock | 180/24.02 |
| 2,712,856 | 7/1955 | MacPhee | 180/24.02 X |
| 2,882,623 | 4/1959 | Gardner | 180/24.02 X |
| 3,178,201 | 4/1965 | Richnow, Jr. | 180/24.02 X |
| 3,201,141 | 8/1965 | Bernstein et al. | 180/24.02 X |
| 3,315,978 | 4/1967 | Chieger et al. | 180/24.02 X |

Primary Examiner—A. Harry Levy
Attorney—Van Valkenburgh and Lowe

[57] ABSTRACT

A spring seat is mounted on each end of a pivot shaft which is mounted transversely of the truck frame between the drive wheels and tag wheels and is pivoted by a rocker arm pivotally connected to the piston rod of a hydraulic cylinder. A roller for engaging the rear end of the corresponding drive wheel leaf spring is mounted at the front upper corner of the spring seat, while a pivot pin for the front end of the corresponding tag wheel leaf spring is mounted at the lower rear corner of the spring seat. The rear end of each tag wheel leaf spring extends into a rear seat attached to the frame, engaging a roller in the rear seat. Lift of the tag wheels is produced when the spring seat is pivoted hydraulically, while the spring seats permit equalization of the load between the drive wheels and the tag wheels. The hydraulic cylinder may be single acting or double acting, but if the latter, a lost motion link is pivoted between the piston rod and the rocker arm.

11 Claims, 8 Drawing Figures

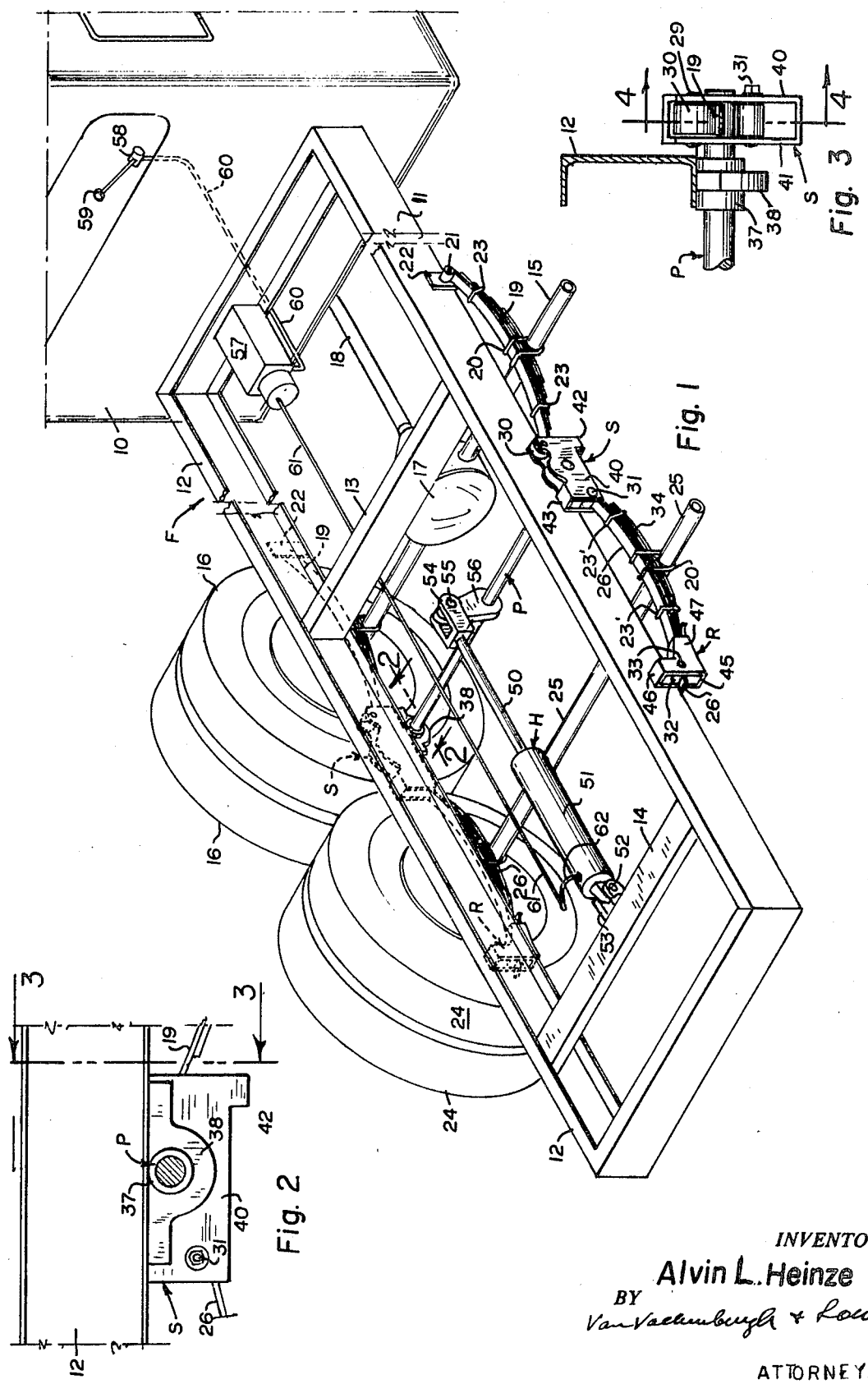

INVENTOR.
Alvin L. Heinze

INVENTOR.
Alvin L. Heinze
BY
ATTORNEYS

TAG WHEEL LIFT

This invention relates to tag wheel lifts, which are devices for raising and lowering a set of normally non-driven wheels of a truck or the like, utilized in conjunction with the driven wheels.

In the operation of trucks, particularly those which at times may carry lighter loads and at other times may carry much heavier loads, the desirability of additional wheels to support additional loads has been evident for a long time. In the case of farm trucks, for instance, which may carry lighter loads during normal farm work, but at other times carry much heavier loads, such as during the harvesting period of sugar beets, has occasioned the application of tag wheels or supplementary wheels to trucks. In view of the fact that the harvesting time of sugar beets, for instance, is relatively short and it is desirable to transport the sugar beets from the field to a sugar factory or point of rail shipment as soon as possible, in order to reduce loss of sugar content through aging, it is common practice to add to the height of the sides of the truck body when carrying sugar beets. Such an increased load, due to the additional weight, may cause the springs or associated parts of the normal or drive wheels to be overloaded, with a consequent danger of failure. Thus, it has been common practice to add a set of tag wheels or non-driven wheels behind the driven wheels, in order to support the extra load. These tag wheels normally have their own set of springs and are connected by an axle, so that an axle type air brake can be utilized in providing a braking effect corresponding to the load being carried. It is uneconomical to install the tag wheels when use therefor is indicated, and to remove the tag wheels after the need for their use has terminated. Also, after the tag wheels have been installed on the truck, there are many times when the load carried by the truck is sufficiently light that the tag wheels are not necessary and it is thus desirable to lift the tag wheels. When the driven wheels sink into a mud hole or the like, the non-driven tag wheels may prevent sufficient weight on the driven wheels to provide sufficient traction to pull the truck out of the mud hole, with the attendant necessity for a towing truck or tractor to be used. Since a truck mired in or about to be mired in a mud hole is proceeding at a very low speed, there is not such a weight upon the driven wheels and springs, even when the truck body contains a very heavy load, that the danger of breaking the springs or other parts is acute. Thus, when a heavily loaded truck has become mired in a mud hole, it is desirable to lift the tag wheels temporarily, in order to permit a greater amount of the load to be received by the driven wheels and thereby enable the driven wheels to produce sufficient traction.

A heavily loaded truck, such as a load of harvested sugar beets, is often driven over rough roads and fields. In such conditions, the drive wheels may drop into a hole or rut, with the result that a major portion of the load is then imposed on the tag wheels. Similarly, when the drive wheels move to elevated ground and the tag wheels drop into the rut or hole left by the drive wheels, the entire load tends to be concentrated on the drive wheels. Thus, it is desirable that the load between the drive wheels and the tag wheels be more nearly equalized, during passage over rough roads.

Among the objects of this invention are to provide a novel tag wheel lift; to provide such a tag wheel lift which will operate effectively to lift the tag wheels either momentarily or for a desired longer period of time; to provide such a tag wheel lift which is constructed so that the load will tend to be equalized between the drive wheels and the tag wheels; to provide such a tag wheel lift which may exist in more than one form; to provide such a tag wheel lift which will be economical to construct and easy to install; and to provide such a tag wheel lift which, in each form, will operate effectively and efficiently.

The foregoing and additional objects, as well as the novel features of this invention will become apparent from the description which follows, taken in conjunction with the accompanying drawings, in which:

FIG. 1 is a condensed perspective view of a truck chassis on which a tag wheel lift of this invention is installed, the wheels on the near side being omitted for clarity of illustration;

FIG. 2 is a fragmentary vertical section, on a slightly enlarged scale, taken along line 2—2 of FIG. 1;

FIG. 3 is a fragmentary vertical section, taken along line 3—3 of FIG. 2;

Figure 5:
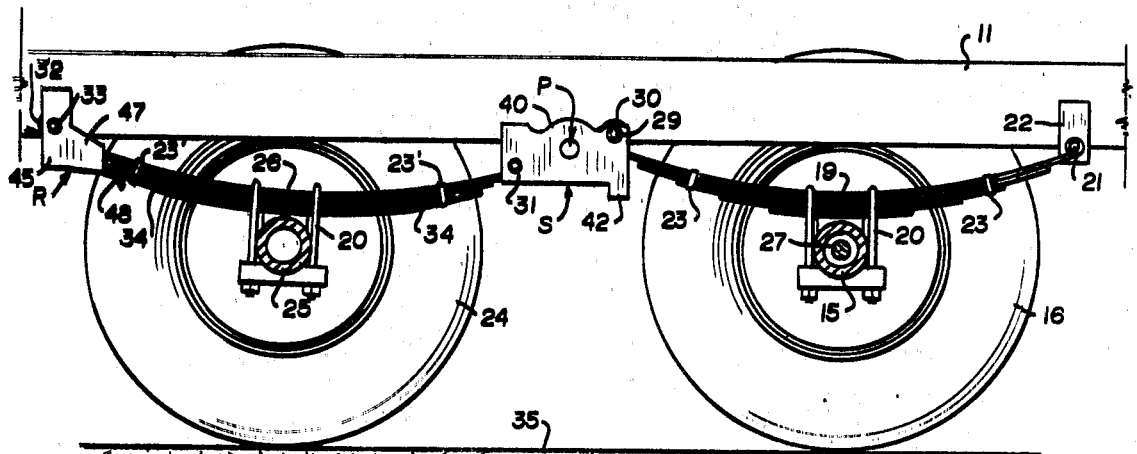
FIG. 5 is a side elevation of a portion of the chassis of FIG. 1, taken partly in section along line 5—5 of FIG. 1 and showing both the drive wheels and the tag wheels in road engaging position.

A truck provided with a tag wheel lift of this invention, as in FIG. 1, may include a cab 10 and a frame F having longitudinal beams 11 and 12 at each side and cross struts 13 and 14. A drive axle housing 15, on which a pair of drive wheels 16 are mounted at each side, is driven from a conventional differential contained in a differential housing 17, with a drive shaft 18 connecting the power plant or engine with the differential. The engine, as well as the front wheels and associated parts, are conventional and therefore are not shown. A suitable body for containing the load to be carried is mounted on the chassis or frame F, but may have any desired conventional shape or configuration and therefore is not shown. Drive axle housings 15 are connected to the drive wheel leaf springs 19 by conventional clamps 20, at each side, with the front ends of the leaf springs 19 being pivotally connected to the frame by a conventional front pin 21 mounted on a bracket 22, welded to the corresponding frame beam 11 or 12. Intermediate the center and each end, the leaves of the springs 19 are also attached by clamps 23. A set of tag wheels 24 are mounted at each side of a tag wheel axle housing 25, rearwardly of the drive wheels, with the tag wheel axle housing being connected by clamps 20 with leaf springs 26 for the tag wheels. It will be noted that the drive wheels and tag wheels on the near side of the chassis are omitted in FIG. 1 for clarity of illustration. In the conventional tag wheel arrangement, the drive wheels would be connected to the differential by drive axles 28, shown in FIGS. 5 and 6, while the tag wheels 24 may be connected by similar axles with an air brake therefor, such as placed at an intermediate position of the tag wheel axle housing 25. Also, the rear ends of the leaf springs 19 would be connected by shackles to pivot pins similar to the front pivot pins 21, while each of the front and rear ends of the tag wheel springs 26 would be connected to the chassis by similar pivot pins and shackles.

In accordance with this invention, a pivotal spring seat S is mounted at each end of a pivot shaft P, which extends laterally beyond the longitudinal beams 11 and 12, while the rear end of the corresponding drive wheel spring 19 and also the front end of the corresponding tag wheel spring 26 is pivotally or otherwise associated with the pivotal spring seat S, so that the spring seat S may be turned, through a hydraulic actuator H, to lift the tag wheels 24, when desired. In addition, as will be described hereinafter, the spring seat S enables the load on the drive wheels and tag wheels to be equalized, when the truck is driven over a rough road or field. Also, a special rear spring seat R, for each of the tag wheel springs 26, permits the rear end of the corresponding tag wheel spring to move forwardly or rearwardly, particularly when the tag wheels are lifted. In further accordance with this invention, each spring seat S is provided with a pin 29 and roller 30 for the rear end of the corresponding drive wheel spring, as in FIG. 4, to receive the upward thrust of the spring and permit longitudinal movement of the spring relative to the pin. Seat S is also provided with a pivot pin 31 for the front end of the corresponding tag wheel spring, with the roller 30 adjacent the upper front corner and the pin 31 adjacent the lower rear corner of the spring seat S. Thus, the roller 30 and pin 31 are spaced longitudinally from pivot shaft P, with roller 30 normally at a higher elevation and pin 31 at a lower elevation. Also, each rear spring seat R is provided with a roller 32 mounted on a pin 33, to facilitate the movement of the rear end of the corresponding tag wheel spring. In addition, the lower leaf 34 of each tag leaf spring is extended forwardly to a point near the spring seat S and rearwardly into the rear seat R, being connected to the remaining leaves by intermediate clamps 23'.

Figure 6:
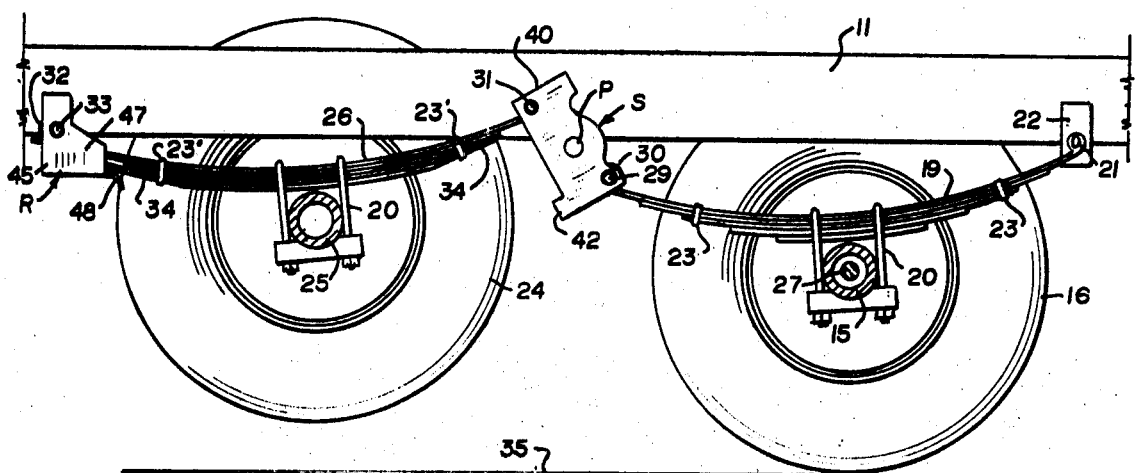
FIG. 6 is a side elevation similar to FIG. 5, but showing the tag wheels lifted.

As illustrated in FIG. 5, in which the tag wheels 24 are shown in "down" or road engaging position, the roller 30 for the drive wheel springs will normally be at a considerably higher elevation than the pin 31 for the tag wheel spring. However, as illustrated in FIG. 6, when the shaft P is turned by the hydraulic actuator H, in a manner described below, the roller 30 will be lowered, moving rearwardly along the top leaf of spring 19, and the pin 31 will be elevated, so that the tag wheels 24 will be lifted off the ground surface 35, and the entire load of the truck body will be supported by the drive wheels 16, through the drive wheel springs 19. The tag wheels 24 are suspended at a higher elevation than otherwise by the lowermost leaf 34 of the spring, through the clamps 23'. As indicated previously, not only is the lifting of the tag wheels advantageous when a lighter load is being carried by the truck, but also when the drive wheels tend to spin, as when sinking into a mud hole or the like. In the latter instance, the tag wheels may be lifted to place the full weight of the load on the drive wheels and thus enable the drive wheels to secure better traction. In addition, the pivoting of the spring seat S, from the position of FIG. 5 to or toward the position of FIG. 6, provides a positive thrust by roller 30 against the drive wheel spring 19, thus producing better traction of the drive wheels.

A further advantage of the pivotal or similar connections of the drive wheel and tag wheel springs to the spring seat S is the equalization of the load on the drive wheels and the tag wheels, when heavy loads are being carried and rough ground is encountered. As will be evident, when the drive wheels 16 encounter a depression, with the tag wheels 24 still on an elevation, the additional load on the tag wheels will cause the front ends of the tag wheel springs to pivot the spring seat S in a clockwise direction, as viewed in FIG. 5, thereby lowering the roller 30 for the drive wheels and equalizing the load between the tag wheels and drive wheels. Similarly, when the drive wheels 16 are on an elevation and the tag wheels 24 in a depression, the additional load on the drive wheels will, through roller 30, cause the spring seat S to pivot in a counterclockwise direction, as viewed in FIG. 5, thereby lowering the pin 31 and causing the tag wheels to receive more of the load, thereby equalizing the load between the tag wheels and drive wheels. It will be noted, of course, that when such irregularities in the ground are encountered, the truck will normally be moving at a fairly low speed. Of course, when the truck is driven on an improved highway and will therefore normally be moving at a considerably higher speed, there is much less need for equalization of the load between the tag wheels and the drive wheels.

Figure 4:
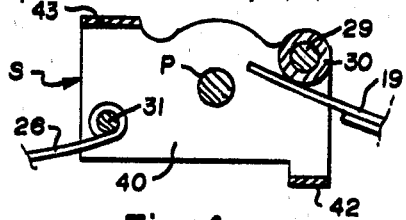
FIG. 4 is a fragmentary vertical section, taken along line 4—4 of FIG. 3.

The shaft P may be installed in any suitable manner, as in FIGS. 1 and 3, such as for pivotal movement in bushings 37 mounted on the underside of beams 11 and 12 by reinforcing plates 38, welded to the underside of the lower flange of the corresponding beam. The spring seat S may be constructed in any suitable manner, as in FIGS. 3 and 4, such as including a pair of side plates 40 and 41 mounted, as by welding, on the extended end of the pivot shaft P. The pins 29 and 31 for the respective springs extend between the side plates, while the side plates may be reinforced at the bottom by a front, lower stirrup 42 and at the top by a transverse rear bar 43, each as shown in FIGS. 1 and 4. The cross bar of the reinforcing stirrup 42 is below the lower edges of plates 40 and 41 to prevent any accumulation of dirt, grease or the like between the side plates from interfering with the movement of drive wheel spring 19. As will be evident, closure of the bottom of the space between the side plates would permit dirt, grease and the like to accumulate therein, whereas the depending stirrup 42 permits any such accumulation to be discharged therefrom by the action of spring 19 whenever the seat S is pivoted. The rear spring seat R may also be constructed in any suitable manner, such as including an upwardly facing stirrup 45, the inner leg of which may be attached, as by welding, to the respective longitudinal beam 11 or 12, and the top of which may be closed by a top bar 46, as in FIG. 1. Pin 33, about which roller 32 may rotate, extends between the sides of stirrup 45, while a trough-shaped guide 47, having an open top and a downwardly sloping bottom, may extend forwardly from the sides of stirrup 45, as in FIGS. 5 and 6. Guide 47 may also be provided with a curved, depending lip 48 at the front. As will be evident, each tag wheel spring 26 will be guided by the guide 47, during movement beneath roller 32.

The hydraulic actuator H may also be constructed in any suitable manner, such as shown in FIG. 1, to include a piston rod 50 extending from a hydraulic cylinder 51, the rear end of which is pivoted on a pin 52 mounted in a bracket 53 attached to the cross strut 14 in a suitable manner, as by welding. Piston rod 50 is attached at its inner end to a conventional hydraulic piston (not shown) within cylinder 51, while the outer end is provided with a fork 54 engaging a pivot pin 55 extending laterally from each side of the upper end of a rocker arm 56. The lower end of rocker arm 56 is attached, as by welding, to the pivot shaft P. As will be evident, when hydraulic fluid is supplied to the inside of cylinder 51, to urge the piston rod 50 outwardly therefrom, the rocker arm and pivot shaft P will be turned, in turn causing the spring seat S to move, as from the position of FIG. 5 to the position of FIG. 6 and thereby lift the tag wheels 24, in the manner described above. The hydraulic arrangement shown in FIG. 1 may be single acting, i.e. adapted merely to move the pivot shaft P and spring seat S from the position of FIG. 5 to the position of FIG. 6 and retain the tag wheels in a lifted position. However, when the hydraulic pressure is released, the load on the drive wheels exerted on roller 30 will produce a torque which causes spring seat S to pivot back to the position of FIG. 5, thereby retracting the piston rod 50, as to the position of FIG. 1.

The hydraulic actuator H includes a control mechanism, which again may be constructed in any suitable manner, such as including a master valve 57 and a control valve 58 operated by a handle 59. The control valve 58 and its handle 59 are conveniently mounted within the cab, so as to be readily accessible to the driver, while the master valve 57 may be mounted in a protected position within the frame, as shown. The control valve 58 may be connected with the master valve 57 by a hydraulic tube 60, while a hydraulic tube 61 may extend rearwardly within the frame to a hose 62, for connection to the rear end of the hydraulic cylinder 51. Hydraulic fluid may be supplied to the control valve 58 and master valve 57 from any suitable hydraulic source, such as a conventional hydraulic pump driven by the truck engine, as for supplying hydraulic fluid to a dump bed.

It will be noted that a 1½ ton rated truck could carry a load of 7 tons, but with the addition of tag wheels and the above lift of this invention, was able to carry 12 tons of sugar beets or grain, or 14 tons of manure or rock, in a side dump bed pivoted at the far side to frame beam 12 and raised and lowered by a spaced pair of triple action hydraulic cylinders, connected between frame beam 11 and the near side of the bed.

Figure 7:
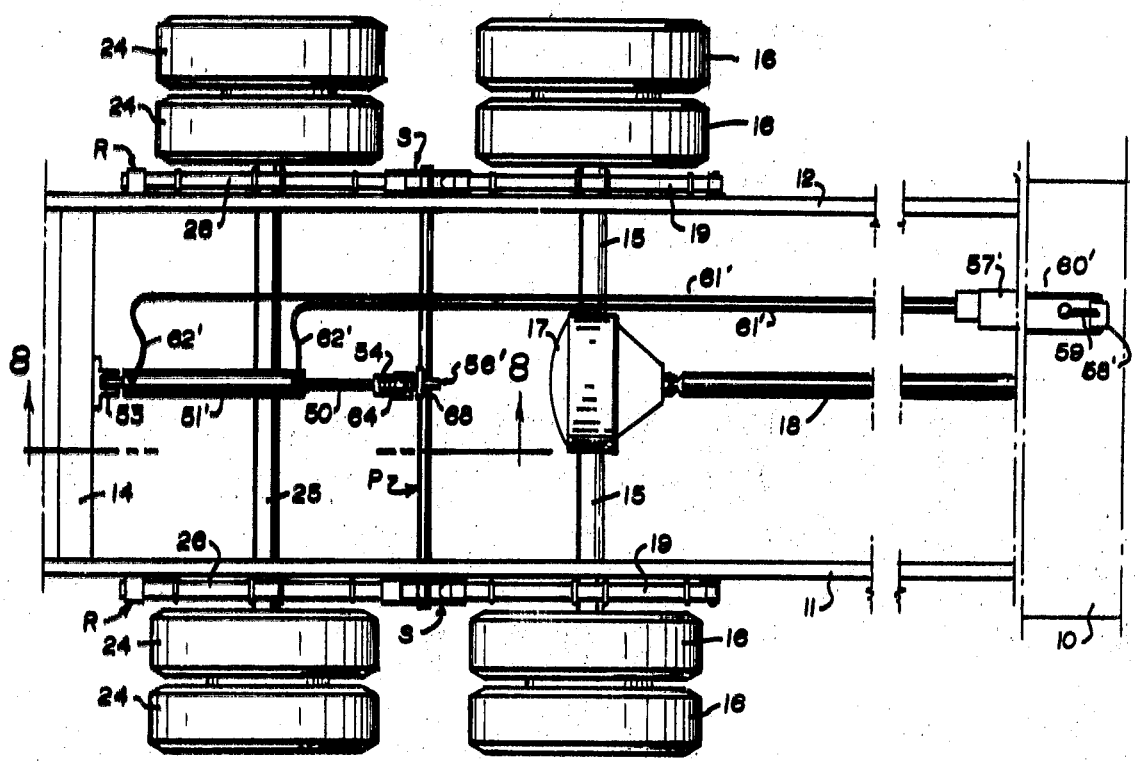
FIG. 7 is a top plan of a truck chassis on which an alternative tag wheel lift of this invention is installed.
Figure 8:
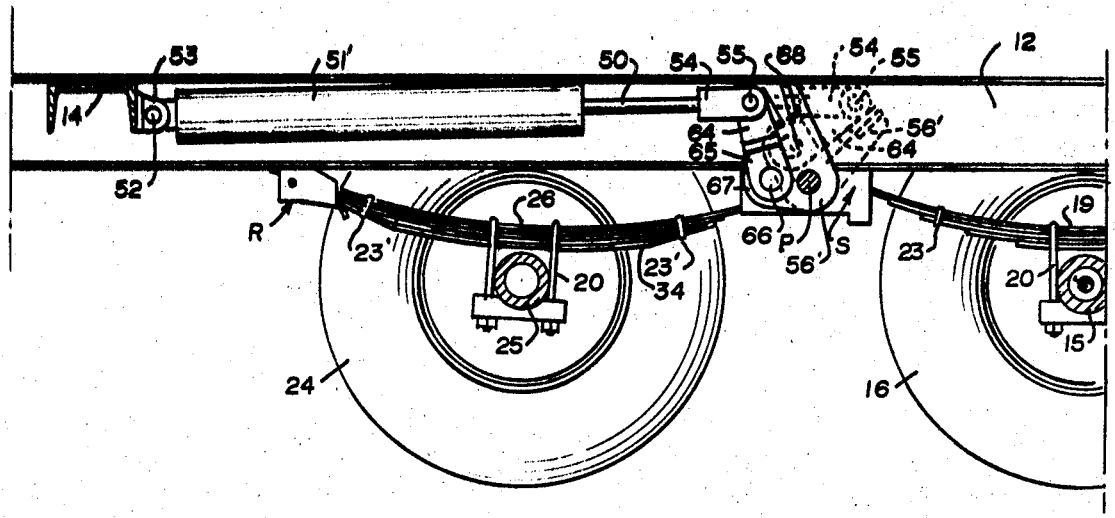
FIG. 8 is a fragmentary vertical section, taken along line 8—8 of FIG. 7.

Although the return of the piston rod 50 from an extended position, corresponding to the position of spring seat S of FIG. 6, to the retracted position of FIG. 1, which corresponds to the position of spring seat S of FIG. 5, is normally readily accomplished by the reverse pivoting of spring seat S through the force exerted at roller 30, this return may be slowed by the resistance of the hydraulic fluid in cylinder 51. Also, with a single acting cylinder, undue wear of the hydraulic piston sealing elements may be occasioned by the back and forth movements of the piston rod 50 through its direct connection to the rocker arm 56, due to movement of spring seat S during normal equalization of the load between the tag wheels and drive wheels when the truck is driven over rough roads or the like. When it is desired to provide a much faster return, a double acting hydraulic cylinder may be utilized, as in the alternative embodiment of FIGS. 7 and 8. In this arrangement, a control valve 58' having a handle 59 is again mounted in the cab 10, for access by the driver, and connected by tubes 60' with a double acting master valve 57', conveniently mounted in the same position as before. The double acting master valve 57' is connected by rearwardly extending hydraulic tubes 61' and hoses 62' with the opposite ends of the hydraulic cylinder 51', for both extending and retracting the piston rod 50 by hydraulic fluid supplied through the master valve. The rear end of cylinder 51' is again conveniently pivotally mounted on a pin 52 mounted on a bracket 53 attached to the cross strut 14, while the piston rod 50 is provided with a fork 54 which pivotally engages a pivot pin 55. In this instance, pivot pin 55 extends laterally from opposite sides of the upper end of a link 64 having a fork 65 at its lower end, which provides a lost motion connection between the piston rod 50 and a rocker arm 56', through a pin 66 pivotally engaged by fork 65. The rocker arm 56' is attached to pivot shaft P, but is provided with a lower, rear extension 67 on which pin 66 is mounted to extend laterally from each side thereof. The top of rocker arm 56' may also be provided with a transverse stop plate or pad 68 which is engaged by the upper end of link 64, when the piston rod 50 is extended, i.e. is moved between the full and dotted positions of FIG. 8. In normal position, link 64 is slightly spaced from the rocker arm stop 68, as in the full position of FIG. 7. As will be evident, when the piston rod 50 is retracted, the link will separate from the rocker arm for movement back to the full position of FIG. 8, with the rocker arm 56', pivot shaft P and spring seat S being free to move to any position determined by the load on the drive wheels and tag wheels. Also, the retraction of piston rod 50 by hydraulic fluid pressure and the separation of link 64 from rocker arm 56' will also prevent undue wear on the sealing parts of the piston within cylinder 51', which might otherwise be occasioned by the back and forth movements of the piston rod, when the spring seat S pivots, during normal equalization of the load between the drive wheels and the tag wheels.

From the foregoing, it will be evident that the tag wheel lift of this invention fulfills to a marked degree the requirements and objects hereinbefore set forth. Thus, not only are the tag wheels readily lifted through a hydraulic cylinder, but the spring seat S permits equalization of the load between the tag wheels and drive wheels. Also, the effective lift of the tag wheels is considerably increased by placing the pivot pin for the front end of the tag wheel springs at a lower position in the spring seat S and the roller for the rear end of the drive wheel springs at a higher position on the spring seat. It is unnecessary to utilize hydraulic pressure to lower the tag wheels, since the normal action of the spring seat will be to return the spring seat to its normal position through the torque produced by the load on the drive wheels. Either a single acting or a double acting hydraulic cylinder may be utilized to lift the tag wheels, although in the latter instance, a lost motion connection between the piston rod and the rocker arm is preferably utilized. The tag wheel lift is also inexpensive to manufacture and install. Certain parts, such as the hydraulic cylinder, master valve and control valve, are conventional and may be obtained from a variety of sources. The spring seats S and R require only simple cutting and welding operations, while no holes are required to be drilled in the truck frame. Also, the rear spring seats R are readily attached to the truck frame by welding. For installation of the spring seats S, the pivot for the front end of each drive wheel spring is undisturbed, so that the only part to be removed is the conventional pivot for the rear end of each drive wheel spring.

Although two preferred embodiments of this invention have been illustrated and described, it will be evident that other embodiments may exist and various changes may be made, all without departing from the spirit and scope of this invention.

What is claimed is:

1. In a tag wheel lift for a truck or the like having a chassis, drive wheels at each side of said chassis, mounting means including an axle for driving said drive wheels, leaf springs attached to said mounting means for supporting said chassis from said drive wheels, tag wheels at each side of said chassis and spaced longitudinally from said drive wheels, means for mounting said tag wheels for rotation and leaf springs attached to said tag wheel mounting means for supporting said chassis from said tag wheels when in use, the improvement including:

spring seat means pivotally mounted at each side of said chassis and disposed between said first mentioned mounting means and said tag wheel mounting means;

means for pivotally associating the adjacent ends of the leaf springs for said drive wheels and said tag wheels with said spring seat means at positions spaced longitudinally of said truck from the pivotal mounting of said spring seat means on said chassis;

means for pivoting said spring seat means in one direction to lower said drive wheel spring association and simultaneously raise said tag wheel spring association; and said spring seat means being constructed and arranged so that with said tag wheels in a lowered position, said drive wheel spring association is at a higher elevation than said tag wheel spring association.

2. In a tag wheel lift, as defined in claim 1, including:

a seat for the opposite end of each said tag wheel spring, permitting sliding movement of said opposite end.

3. In a tag wheel lift, as defined in claim 1, wherein:

said tag wheels are mounted rearwardly of said drive wheels;

said pivotal mounting of said spring seat means on said chassis including a pivot shaft;

said spring seat means each comprises a pair of side plates attached to an end of said pivot shaft extending laterally beyond a longitudinal beam of said chassis, a pin and a roller for engaging the rear end of a drive wheel leaf spring mounted at the upper corner of said plates and extending therebetween, a pivot pin for the front end of said tag wheel leaf spring extending between the lower rear corners of said side plates, and transverse reinforcing means extending between said side plates adjacent the upper rear and lower front corners thereof; and rear seat means for the rear end of each said tag wheel spring, including a box-shaped member attached to said chassis having a forwardly extending guide for the underside of said tag wheel spring and a roller for engaging the top of said tag wheel spring.

4. In a tag wheel lift, as defined in claim 3, wherein:

each said tag wheel leaf spring comprises a plurality of superimposed leaves, with the upper leaf being connected at the front end to said pivot pin and the rear end thereof extending beneath said roller of said rear seat, intermediate leaves of successively shorter length, the lowermost leaf extending forwardly to a position adjacent said spring seat and rearwardly to within said rear seat, and clamps connecting said upper and lower leaves at positions between said mounting means and said ends.

5. In a tag wheel lift for a truck or the like having a chassis, drive wheels at each side of said chassis, mounting means including an axle for driving said drive wheels, leaf springs attached to said mounting means for supporting said chassis from said drive wheels, tag wheels at each side of said chassis and spaced longitudinally from said drive wheels, means for mounting said tag wheels for rotation and leaf springs attached to said tag wheel mounting means for supporting said chassis from said tag wheels when in use, the improvement including:

spring seat means at each side and disposed between said first mentioned mounting means and said tag wheel mounting means;

a shaft mounted transversely of said chassis for pivotal movement and attached to said spring seat means;

means for pivotally associating the adjacent ends of the leaf springs for said drive wheels and said tag wheels with said spring seat means at positions spaced longitudinally of said truck from said shaft;

means for turning said shaft so as to cause said spring seat means to pivot in one direction to lower said drive wheel spring association and simultaneously raise said tag wheel spring association; and said spring seat means being constructed and arranged so that with said tag wheels in a lowered position, said drive wheel spring association is at a higher elevation than said tag wheel spring association.

6. In a tag wheel lift, as defined in claim 5, wherein:
said means for turning said shaft includes a hydraulic cylinder and piston.

7. In a tag wheel lift, as defined in claim 6, including:
means pivotally connecting said piston rod means to rocker arm means attached to said shaft.

8. In a tag wheel lift, as defined in claim 7, wherein:
said hydraulic cylinder is single acting.

9. In a tag wheel lift, as defined in claim 7, wherein:
said hydraulic cylinder is double acting.

10. In a tag wheel lift, as defined in claim 9, wherein:
said means pivotally connecting said piston rod means and said rocker arm means includes a lost motion connection.

11. In a tag wheel lift, as defined in claim 7, wherein:
said hydraulic cylinder is double acting; and
said piston rod means is interconnected to said rocker arm means through a link pivotally connected at its upper end to said piston rod means and at its lower end pivotally connected to said rocker arm means, said link providing a lost motion connection between said piston rod means and rocker arm means, permitting said piston rod means to move rearwardly from the upper end of said rocker arm means without turning said shaft, but causing said link to engage said rocker arm means to turn said shaft when said piston rod means moves forwardly.

* * * * *